United States Patent [19]
Corman et al.

[11] 3,801,843
[45] Apr. 2, 1974

[54] ROTATING ELECTRICAL MACHINE HAVING ROTOR AND STATOR COOLED BY MEANS OF HEAT PIPES

[75] Inventors: James C. Corman, Scotia; Robert F. Edgar, Schenectady; Michael H. McLaughlin; Russell E. Tompkins, both of Scotia, all of N.Y.

[73] Assignee: General Electric Company, Schenectady, N.Y.

[22] Filed: June 16, 1972

[21] Appl. No.: 263,665

[52] U.S. Cl. .................................... 310/52, 310/58
[51] Int. Cl. ............................................. H02k 9/00
[58] Field of Search ............ 310/52, 53, 54, 55, 56, 310/57, 58, 64; 29/605

[56] References Cited
UNITED STATES PATENTS

| | | | |
|---|---|---|---|
| 1,700,840 | 2/1929 | Gay | 310/52 |
| 1,739,137 | 12/1929 | Gay | 310/52 |
| 2,722,616 | 11/1955 | Moses | 310/64 |
| 3,084,418 | 4/1963 | Procopio | 29/605 |
| 3,646,374 | 2/1972 | Jordan | 310/45 |
| 3,652,881 | 3/1972 | Albright | 310/64 |
| 2,361,854 | 10/1944 | McCormack | 310/52 |
| 3,119,032 | 1/1964 | Mullner | 310/64 |

Primary Examiner—R. Skudy
Attorney, Agent, or Firm—Patrick D. Ward; Joseph T. Cohen; Jerome C. Squillaro

[57] ABSTRACT

A polyphase induction motor having a rotor and a stator, each having heat pipes incorporated therein, is disclosed. The stator is comprised of a stack of laminations having radial slots therein which contain heat pipes as well as electrical conductors. The stator heat pipes are located in the stator slots and extend axially to a remote location beyond the stator and the rotor. The stator heat pipes contain wicks and contain a two-phase fluid coolant. The rotor is also comprised of a stack of laminations with radial slots located in the outer periphery thereof. Heat pipes are incorporated in the rotor slots and, like the heat pipes in the stator slots, extend axially to a remote location beyond the rotor and the stator. The rotor heat pipes also serve as electrical conductors as well as heat exchangers for cooling the rotor. Thus, all of the rotor heat pipes are electrically interconnected by end rings located at the axial extremities of the rotor. The rotor heat pipes also contain a two-phase fluid coolant. However, because centrifugal force promotes condensate return within the rotor heat pipes wicks need not be used in the rotor heat pipes. Cooling fins are provided on those sections (condenser sections) of the heat pipes which extend axially beyond the rotor and the stator thereby forming air heat exchangers. Moreover, the fins on the moving rotor heat pipes act as moving fan blades and, being located proximate to the cooling fins on the stator heat pipes, effectively form a single-pass, forced-convection, air heat exchanger.

7 Claims, 20 Drawing Figures

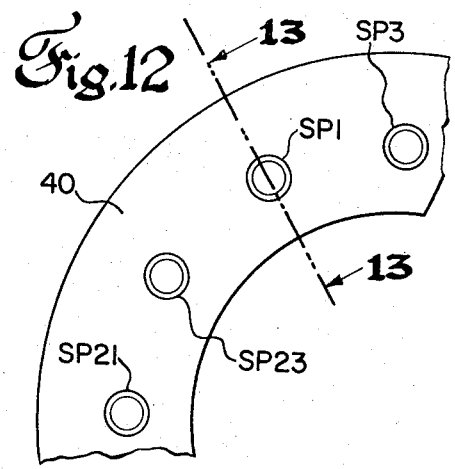
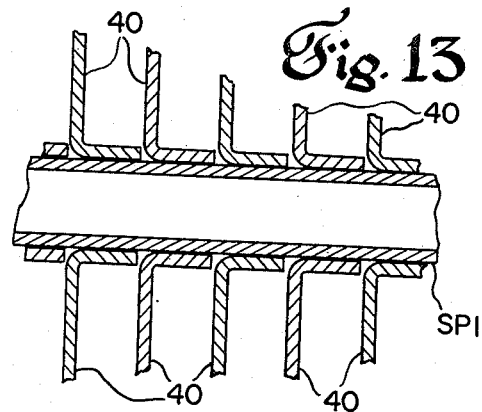
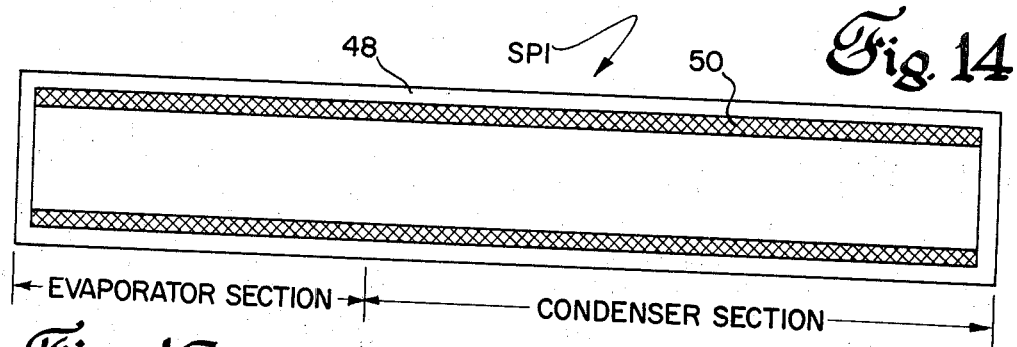
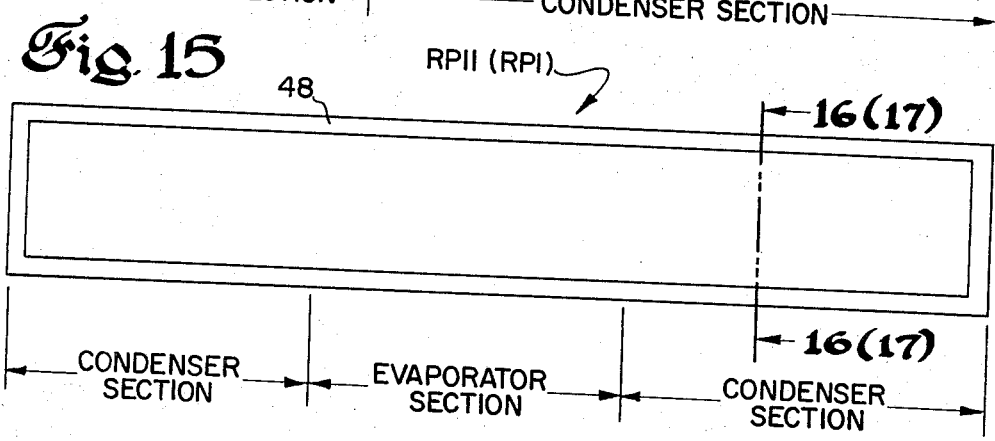
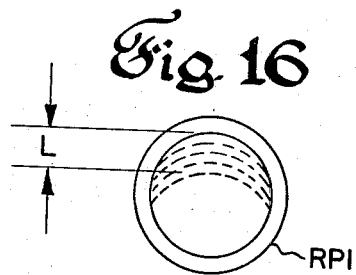
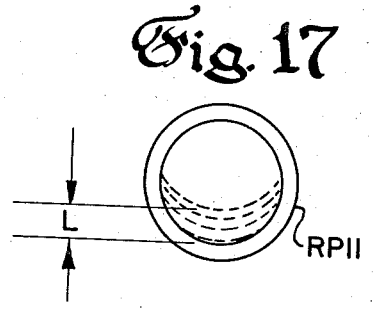

ROTATING ELECTRICAL MACHINE HAVING ROTOR AND STATOR COOLED BY MEANS OF HEAT PIPES

The invention herein described was made in the course of or under a contract or subcontract thereunder with the Department of the Army.

BACKGROUND OF THE INVENTION

The subject invention pertains, in general, to the cooling of rotating electrical machinery; and, in particular, to an electrical machine having a rotor and a stator, each having heat pipes incorporated therein, said heat pipes containing a two-phase fluid for cooling said rotor and stator.

Although the invention is hereinafter described, and illustrated in the accompanying drawing figures, as being embodied in a polyphase induction motor having heat pipes incorporated in the rotor and in the stator thereof, it is to be understood that the invention may be employed in rotating electrical machines other than those designated as induction motors. Indeed, the invention is adapted for use in a wide variety of rotating, or otherwise moving, apparatus from which heat is to be removed.

A number of methods of cooling rotating electrical machines have been proposed. Some are widely used. For example, in one of the more conventional cooling methods air is employed as the coolant in a forced convection method of cooling electric motors. Less conventional cooling methods employ liquid coolants which are sometimes used in spray form. Such cooling methods are not entirely satisfactory for machines operated at moderate power densities. Moreover, such cooling methods become unsatisfactory for machines which are to be operated at higher-than-moderate power densities. Also, with increasing stator anf rotor dimensions such cooling methods ultimately become unsatisfactory.

In the forced convection method of cooling a conventional motor, operated at a moderate power density, air is introduced into the motor housing and forced over the outer periphery of the stator and the stator end windings. More advanced designs include air flow paths along the gap between the rotor and stator and through channels provided in the stator. Effective air cooling of the stator by the forced convection cooling method is subject to, among others, such frustrating influences as: the necessary presence of dielectric material in the stator slots; the relatively low thermal conductivity of the stator in a direction perpendicular to individual iron laminations stacked to form the stator; the relatively high thermal impedance of the feasible heat flow paths in the stator; and, the relatively large temperature difference existing between the region of the stator slot and the air gap between the rotor and the stator. The aforesaid influences become more frustrating where stator and rotor dimensions are increased, or in cases where a particular motor is operated in an increased power density.

Because of the necessary presence of dielectric insulation in the stator slots the maximum temperature to which the temperature in the slot may rise must be limited in designing the stator. Otherwise, dielectric breakdown of the electrical insulation will occur.

The thermal conductivity of the stator iron in a direction perpendicular to the individual iron laminations in the stack forming the stator is so low that axial conduction of heat through the iron laminations to the ends of the stator stack is negligible. Other feasible paths for dissipating stator heat exist. For example, the heat may be dissipated in a path which extends radially outward to the outer periphery of the stator. Another path extends in the opposite direction: radially inward to the stator teeth, across the dielectric insulation material (the slot liner) to the stator slot, and axially along the stator slot to the end windings. Although feasible as these paths are the dissipation of stator heat is nevertheless limited by the high conduction resistance, or impedance, of these heat flow paths, especially as the dimensions of the stator increase; e.g., increases in the stator diameter and increases in the length of the stack of laminations forming the stator.

A restriction on the temperature rise in the stator slot is the air-side temperature difference. This is due to: (a) the limited surface area in contact with the air flow, and (b) the conduction temperature rise (fin effectiveness) encountered in attempting to increase the effective surface area. Again, with increasing power densities and/or increasing stator dimensions the problem becomes more acute. Furthermore, the aforementioned air-side temperature difference is increased in schemes where an air pumping device (e.g., a fan) is coupled to the shaft of the rotor for the purpose of forcing more air through the motor. When the motor is run at low speed a significant reduction in air flow occurs thereby increasing the aforesaid air-side temperature difference.

When employing air in a forced convection cooling system for cooling a rotor of an induction motor, for example, relatively high thermal impedances are associated with the thermal transport mechanisms associated with such a cooling method. Such thermal transport mechanism are: (1) heat conduction in the conductor bars of the rotor; and (2) dissipation of heat to the surrounding air environment. The thermal resistances, or impedances, associated with the aforementioned thermal transport mechanisms are rather formidable, especially where the induction motor rotor losses are significantly increased during "off design" operation as, for example, adjustable speed operation employing variable frequency control with non-sinusoidal stator fields. The increased rotor losses which occur produce excessive temperature rises in rotors which are conventionally cooled by the forced convection cooling method.

With less conventional cooling methods employing liquid coolants such methods are complicated by the complexity of the liquid supply system. In such systems dynamic, or rotating, seals are often required and these seals introduce additional maintenance and reliability problems. In order to avoid using dynamic seals the liquid coolant is often introduced into the rotor in the form of a liquid spray. However, this has the disadvantage of increasing friction and windage losses. Furthermore, additional problems are presented because the free liquid in the motor housing must be contained.

SUMMARY OF THE INVENTION

One object of the invention is to provide a rotating electrical machine which is cooled with the aid of a two-phase fluid coolant.

Another object of the invention is to provide a rotating electrical machine including a stator which is cooled with the aid of a two-phase fluid coolant.

Another object of the invention is to provide a rotating electrical machine including a rotor which is cooled with the aid of a two-phase fluid coolant.

Another object of the invention is to provide a rotating electrical machine which is cooled with the aid of a two-phase fluid which is hermetically contained in one, or more, heat pipes while undergoing a vaporization-condensation cycle so that the fluid, whether it is in its liquid phase or its vapor phase, never directly contacts parts of said electrical machine other than said heat pipe, or pipes.

Another object of the invention is to provide a rotating electrical machine including a stator having one or more heat pipes incorporated therein, each heat pipe containing a two-phase fluid; said heat pipes and contained fluid effectively cooling said stator notwithstanding the presence of dielectric material in the slots of said stator.

Another object of the invention is to provide a rotating electrical machine including a stator having one or more heat pipes incorporated therein; each heat pipe containing a two-phase fluid; said heat pipes and contained fluid effectively cooling said stator by providing one or more paths of relatively low thermal impedance for the transport of heat away from said stator.

Another object of the invention is to provide a rotating electrical machine including a rotor having one or more heat pipes incorporated therein, each heat pipe containing a two-phase fluid; said heat pipes and contained fluid effectively cooling said rotor by providing one or more paths of relatively low thermal impedance for the transport of heat away from said rotor.

Another object of the invention is to provide a rotating electrical machine including a rotor having one or more heat pipes incorporated therein, each heat pipe containing a two-phase fluid; said heat pipes and contained fluid effectively cooling said rotor and said heat pipes also serving as conductors of electrical current in said rotor.

Another object of the invention is to provide a rotating electrical machine including a rotor having one or more heat pipes incorporated therein, each heat pipe containing a two-phase fluid; the rotation of said heat pipes together with said rotor acting as a fan for supplying coolant air to said heat pipes and said rotor, inter alia.

Another object of the invention is to provide a rotating electrical machine including a stator having one or more heat pipes incorporated therein, each heat pipe containing a two-phase fluid; portions of said heat pipes acting as air cooled heat exchangers.

In accordance with the invention there is provided a rotating electrical machine comprising a stator and a rotor, each having at least one heat pipe in which there is contained a two-phase fluid coolant. Each heat pipe includes a first section thereof which is in contact with, or proximate to, a heat producing portion of the machine and a second section which is remote from the machine but in communication with the first section. Vaporization of the fluid occurs at said first section and condensation of the vaporized fluid occurs at the second section.

One feature of the invention resides in locating at least one heat pipe axially within a slot in the stator so that the first, or vaporization, section of the heat pipe is readily available for absorbing heat from the stator in the region of the slot and transporting said heat axially within the heat pipe to at least one extremity of the heat pipe located beyond the stator whereat the second, or condensation, section of the heat pipe rejects the absorbed heat.

Another feature of the invention resides in providing the aforesaid heat pipe, or pipes, with cooling fins connected to said second, or condensation, section thereof at a location relatively remote from the stator so that the cooling fins at said second section enhance said second section's operation as an air cooled surface condenser, or heat exchanger.

Another feature of the invention resides in locating the aforesaid heat pipe, or pipes, within individual stator slots together with electrical conductors and dielectric material.

Another feature of the invention resides in locating at least one heat pipe axially within a slot in the rotor so that the first, or vaporization, section thereof is readily available for absorbing heat from the rotor in the region of the slot and transporting said heat axially within the heat pipe to at least one extremity of the heat pipe located beyond the rotor whereat the second, or condensation, section of the heat pipe rejects the absorbed heat.

Another feature of the invention resides in providing the aforesaid rotor heat pipe, or pipes, with cooling fins connected to said second, or condensation, section thereof at a location relatively remote from the rotor so that the cooling fins at said second section enhance said second section's operation as an air cooled surface condenser or heat exchanger.

Another feature of the invention resides in using the aforesaid heat pipes located in the rotor as electrical conductors as well as means for absorbing and rejecting the heat of said rotor.

Another feature of the invention resides in arranging said heat pipes in said rotor in skewed relationship with respect to the longitudinal central axis of said rotor so that the motor, including said rotor and skewed heat pipes, may better function as an induction motor.

Another feature of the invention resides in providing said rotor heat pipe, or pipes, with cooling fins connected to said second, or condensation, section thereof at a location relatively remote from the rotor so that rotation of said rotor together with said heat pipes enables said heat pipes and cooling fins thereon to act as a fan to enhance cooling of said rotor, inter alia.

Another feature of the invention resides in providing the aforesaid rotor heat pipe, or pipes, with cooling fins connected to said second, or condensation, section thereof at a location relatively remote from the rotor and the stator so that the rotation of said rotor and included heat pipes enables said heat pipes to operate as a fan thereby enhancing the cooling of said stator and heat pipes included in said stator.

Another feature of the invention resides in employing a wickless heat pipe, or pipes, in the rotor remote from the central axis thereof and taking advantage of the relatively high $g$ forces occurring during rotor rotation to promote coolant liquid return within said heat pipe, or pipes, as well as improved vaporization and condensation of a two-phase fluid coolant contained in said heat pipe, or pipes.

Another feature of the invention resides in arranging at least one heat pipe in at least one stator slot which may also contain dielectric material as well as at least one separate electrical conductor and embedding, or potting, at least said conductor in a matrix of epoxy resin filled with particles which have at least relatively moderate thermal conductivity but relatively low electrical conductivity thereby significantly reducing thermal impedance to heat flow in the region of said stator slot.

Other objects and features, as well as the many advantages of the invention, appear hereinafter wherein the invention is disclosed by means of illustrative examples thereof and with reference to the accompanying drawing figures.

DRAWINGS

Figure 11:
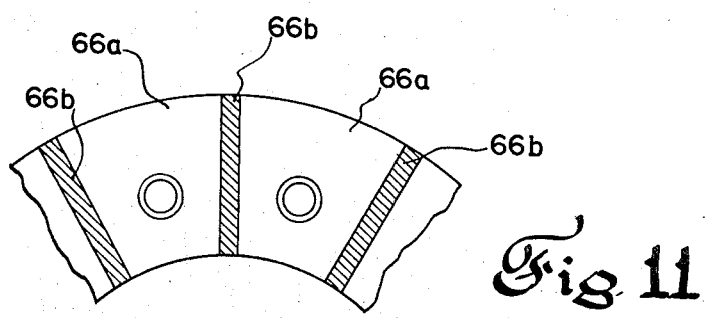

FIG. 11 is a fragmentary view of an end view of some heat pipes located in stator slots and showing the kind of electrical isolation, either by separation or the inclusion of dielectric material, which the cooling fin structure requires in situations where each heat pipe extends axially beyond both ends of the stack of stator laminations; the illustrated construction preventing continuous electrical conduction paths for electrical currents which would otherwise flow due to induced voltages occasioned by the changing magnetic field in the region of the stator heat pipes.

Figure 3:
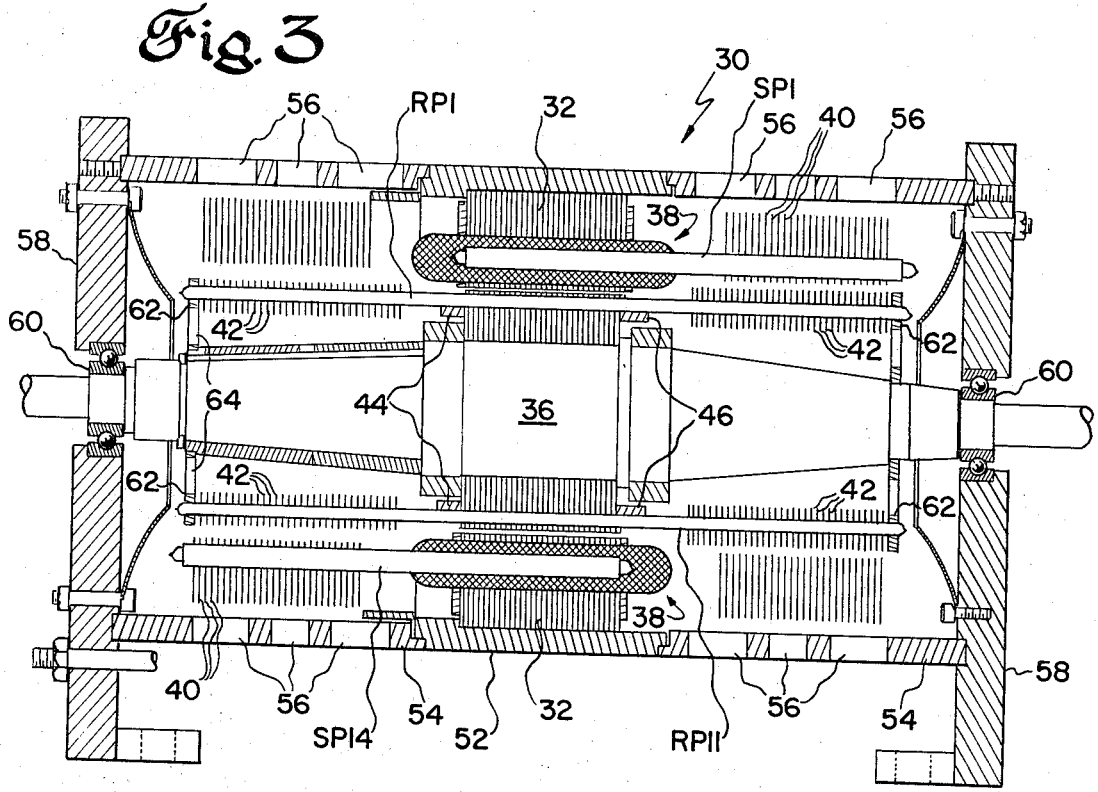
FIG. 3 is a reduced size cross section view taken along the section 3—3 in FIG. 2 and showing a longitudinal cross section view (axial view) along the central axis of the induction motor.

FIG. 12 is another fragmentary view showing an end view of some of the heat pipes located in stator slots and illustrating an annular cooling fin structure which may be used with said heat pipes where, as in FIG. 3, the condensation end of said heat pipes extend from one end only of the stack of stator laminations; the annular cooling fin construction shown in FIG. 12 interconnecting the stator heat pipes without the danger of forming any short-circuit electrical paths interlinking with the magnetic flux in the induction motor.

FIG. 13 is a cross section view taken along the section line 13—13 in FIG. 12.

FIG. 14 is a diagrammatic longitudinal, or axial, cross section of a stator heat pipe including therein a wick for promoting condensate return of the liquid phase of the two-phase fluid coolant contained in said heat pipe by means of capillary action.

FIG. 15 is another diagrammatic longitudinal, or axial, cross section of a rotor heat pipe having confined therein a two-phase fluid coolant; no wick being provided in the heat pipes employed in the rotor.

FIG. 16 is a cross section view taken along section line 16—16 in FIG. 15 showing the liquid coolant's position in the condenser section of the heat pipe when said rotor is rotating and said heat pipe is momentarily situated during said rotation at the uppermost orientation in the induction motor with the condensate also located at the uppermost wall surface of the heat pipe due to centrifugal, or g forces.

FIG. 17 is another cross section view taken along section line 17—17 in FIG. 15 showing the liquid coolant's position in the condenser section of the rotor heat pipe when said rotor is rotating and said heat pipe is momentarily located at the lowermost orientation of the induction motor with the condensate also located at the lowermost wall surface of the heat pipe due to centrifugal forces, or g, forces.

Figure 18:
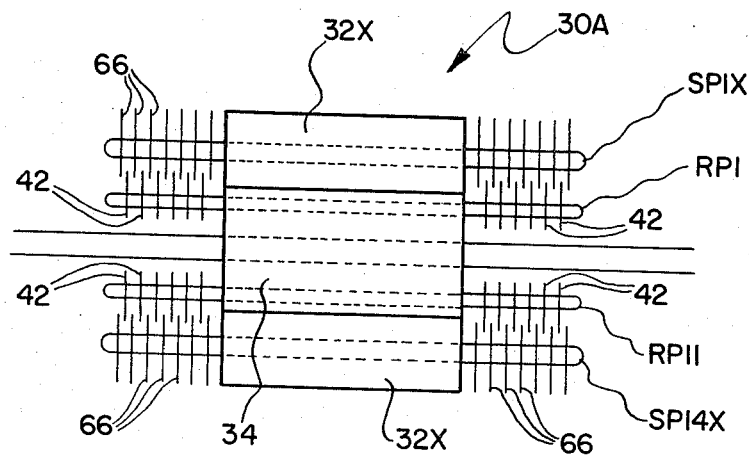

FIG. 18 is a diagrammatic view showing an alternative embodiment of the invention; i.e., an induction motor with heat pipes located in the stator and rotor thereof extending from opposite ends of the stack of rotor and stator laminations.

Figure 19:
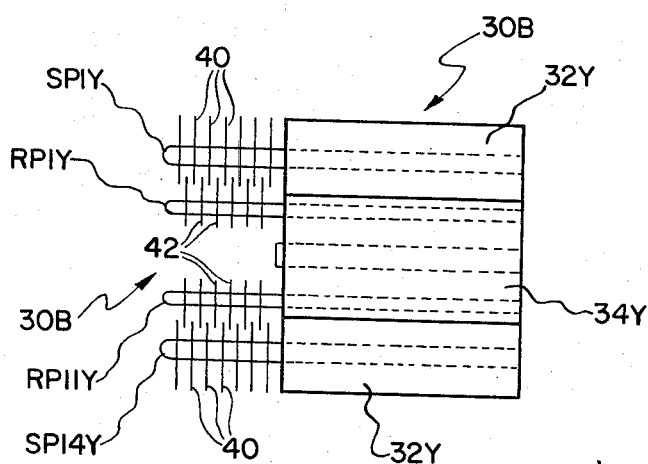

FIG. 19 is another diagrammatic view of still another embodiment of the invention; i.e., another induction motor with heat pipes located in the rotor and stator extending only from one end of the stack of laminations forming said rotor and said stator.

Figure 20:
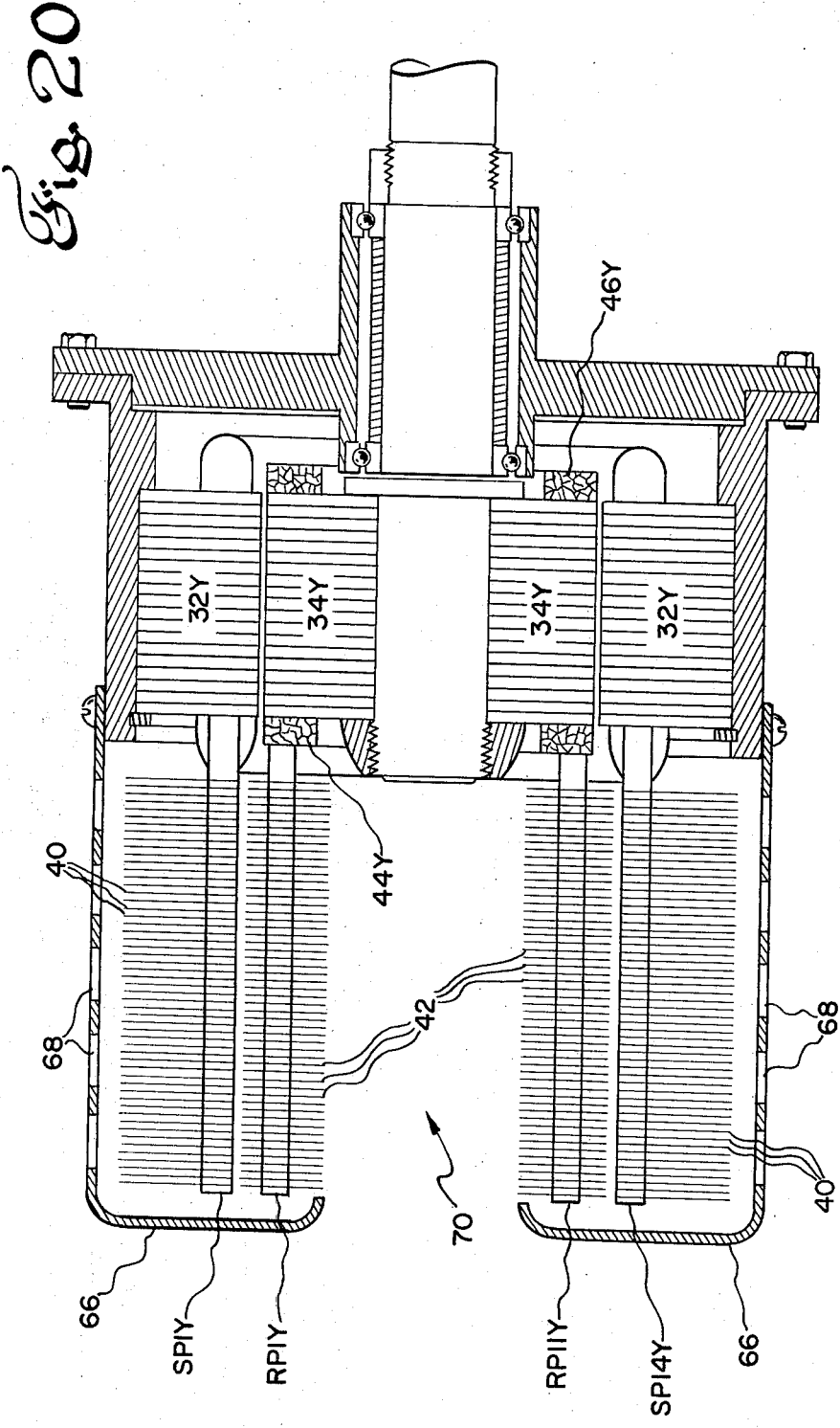

FIG. 20 is a longitudinal, or axial, cross section of an induction motor in accordance with the embodiment of FIG. 19.

DETAILED DESCRIPTION

Figure 1:
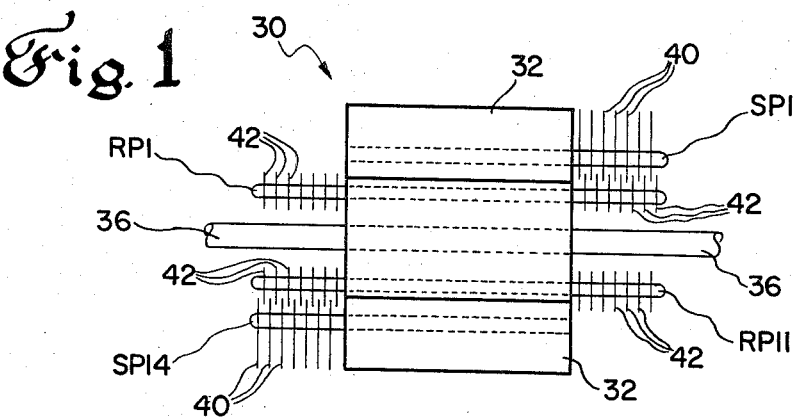
FIG. 1 is a diagrammatic view of one embodiment of the invention; i.e., an induction motor, the details and various modifications thereof being illustrated at FIGS. 2 through 17, inclusive, hereinafter appearing.

A first embodiment of the invention is diagrammatically illustrated at FIG. 1 wherein an induction motor designated, generally, by the reference number 30 is shown. Specific details of construction of the motor 30, as well as some modifications of said details, are illustrated in FIGS. 2 through 10 and FIGS. 12 through 17. The induction motor 30, diagrammatically represented in FIG. 1, is a three-phase induction motor having a stator 32 and a rotor 34. A shaft 36 is keyed, or otherwise rigidly fixed, to the rotor 34. The shaft 36 is illustrated in FIG. 1 as extending axially from opposite ends of the rotor 34. However, the shaft 36 may be arranged to extend from only one end of the rotor 34, if desired. The stator 32 has a number of heat pipes, such as the heat pipes SP1 and SP14, included therein. Likewise, the rotor 34 has a number of heat pipes, such as the heat pipes RP1 and RP11, included therein. As indicated in FIG. 1 every rotor heat pipe, like the heat pipes RP1 and RP11, extend axially in opposite directions beyond both ends of the rotor 34. However, the arrangement of the stator heat pipes is different. As indicated in FIG. 1 some stator heat pipes, like the heat pipe SP1, extend axially beyond the stator 32 (and rotor 34) from only one end of the motor while other heat pipes, like the heat pipes SP14, extend axially beyond the stator and the rotor from an opposite end of the motor.

Heat pipes are known devices for effecting heat transfer by vaporization of a liquid contained within a closed chamber, or pipe, by the application of heat to a vaporization, or evaporator, section of the chamber or pipe. The vapor, thus generated, moves to a condensation section of the chamber, or pipe, which may be a surface condenser section, whereat the vapor condenses and the condensate returns to the evaporator section to be vaporized again and, thus, repeat the heat transfer cycle. Often, a wick is used to return the condensate to the vaporization, or evaporator, section of the heat pipe by means of capillary action. Heat pipes and their operation is disclosed in, among other sources, the magazine Scientific American, May 1968 issue, beginning at page 38. The heat pipes, such as RP1 and RP11 shown at FIG. 1, employed in the rotor 34 of the induction motor 30 do not employ a wick for returning condensate by means of capillary action. Rotation of the rotor 34 and consequent centrifugal force acts to promote condensate return, among other things, in the rotor heat pipes employed in the present invention. The heat pipes employed in the stator in accordance with the present invention are discussed hereinafter with reference to FIG. 14. The heat pipes employed in the rotor in accordance with the present invention are discussed hereinafter with reference to FIGS. 15, 16, and 17.

Figure 2:
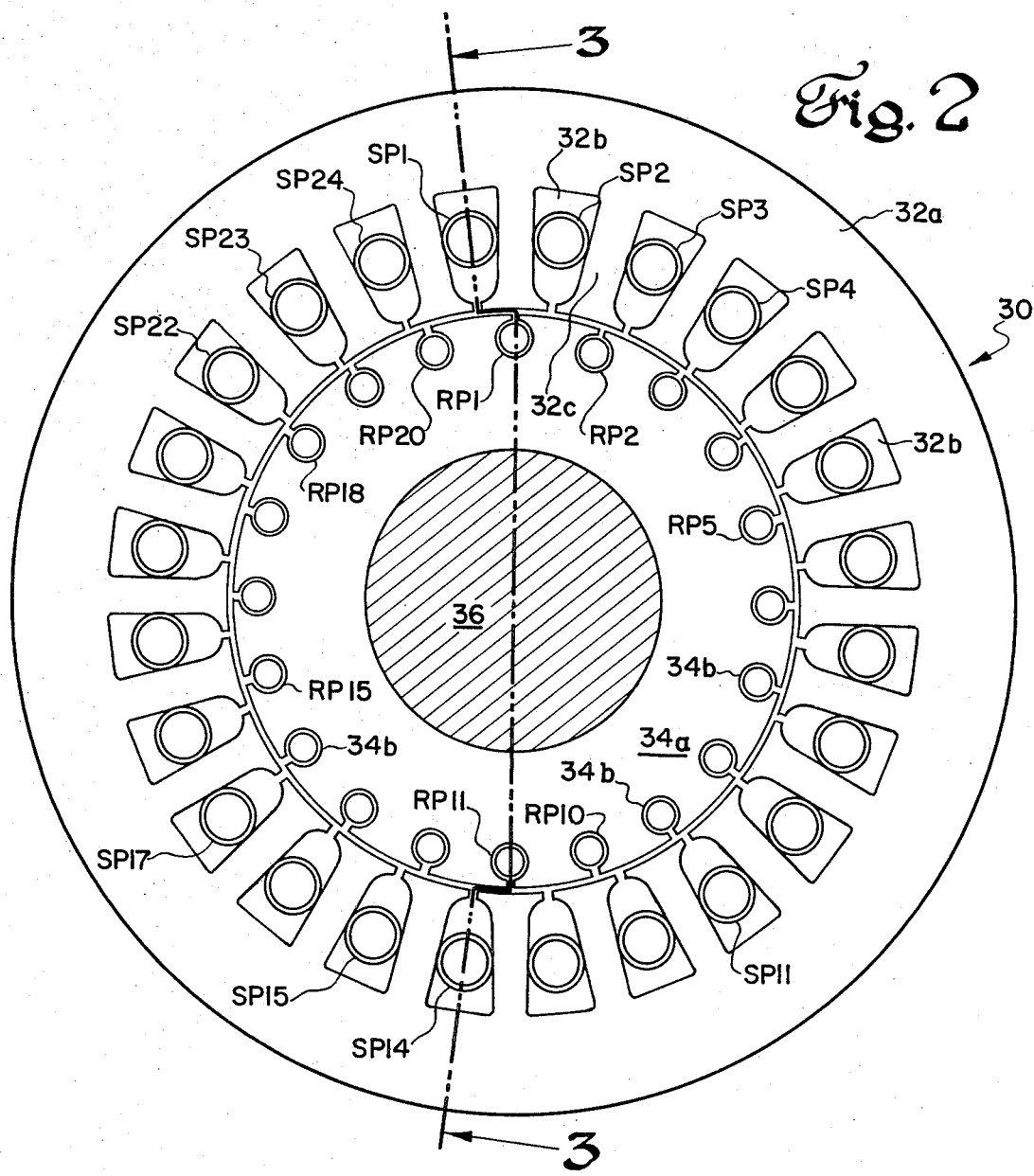
FIG. 2 is a cross section view of the induction motor showing the stator and rotor thereof with heat pipes located in slots in the stator and in the rotor.

As indicated in FIGS. 2 and 3 the stator 32 of the motor 30 is comprised of a stack of suitable electrical steel laminations 32a...32a, each of which has been punched so as to form a number of slots 32b...32b and teeth 32c...32c separating the slots 32b. The slots 32b and neighboring teeth 32c are spaced at regular intervals around the inner periphery, or air gap side, of the stator 32. Although each slot 32b and each tooth 32c has the size and geometric configuration shown in FIG. 2, it is to be understood that different slot sizes and configurations, as well as different tooth sizes and configurations, may be employed.

As indicated in FIGS. 2 and 3 the rotor 34 of motor 30 is comprised of a stack of suitable electrical steel laminations 34a...34a, each of which is of a generally annular form, similar to the stator laminations 32a...32a. The rotor laminations 34a...34a form a stack, defining the rotor 34, which is keyed, or otherwise secured, to a shaft 36 which, as shown in FIG. 3, extends axially from opposite ends of the rotor 34. Each rotor lamination 34a is punched so as to have formed therein a number of slots 34b...34b, which are spaced at regular intervals around the outer periphery or air gap side, of the rotor 34. Although each rotor slot 34b has the geometric configuration shown in FIG. 2 it is to be understood that different slot sizes and configurations may be employed.

The stator 32 of induction motor 30 has 24 slots 32a and the rotor 34 has twenty slots 34a. The aforementioned numbers of slots formed in the stator 32 and in the rotor 34 for the specific example shown in FIGS. 1, 2, and 3 are to be considered as being illustrative, not limiting. More than, or less than, the indicated numbers of rotor slots and stator slots may be employed, depending on the design specification.

As shown in FIGS. 2 and 3 each of the 24 stator slots 32b has an individual heat pipe situated therein; the heat pipes being designated by the reference characters SP1...SP24. Also, each of the 20 rotor slots 34b has an individual heat pipe situated therein; the heat pipes in the rotor slots being designated by the reference characters RP1...RP20. The stator heat pipes SP1, SP3, SP5, SP7, SP9, SP11, SP13, SP15, SP17, SP19, SP21, and SP23 extend from only one end of the stator 32; i.e., the right hand end in the orientation shown in FIG. 3. Similarly, the stator heat pipes bearing the even numbered reference characters (e.g., SP2, SP4...SP24) extend from only the opposite end of the stator 32; i.e., from the left hand end in the orientation shown in FIG. 3. Thus, in neighboring stator slots 32b the heat pipes extend axially through and byond the slots; but, they extend beyond the slots in different directions, from opposite ends of the stator 32. As is discussed in more detail hereinafter, each heat pipe includes an axially extending section designated as the vaporization, or evaporation, section and an adjacent axially extending section designated as the condenser section. The vaporization section, receiving heat from the apparatus to be cooled, causes the liquid phase of a two-phase fluid coolant to vaporize, or evaporate, within the heat pipe. The heated vapor, being under a relatively higher vapor pressure, moves to the lower pressure area or condenser section of the heat pipe whereat the vapor condenses forming condensate. The condenser section in the heat pipe is, in effect, an air-cooled surface condenser functioning to reject heat to ambient air. Thus, that portion of each heat pipe which lies axially within a stator slot 32b may be considered to be the vaporization, or evaporator, section of the heat pipe and that portion of each heat pipe which extends axially from the slot beyond the end of the stator to a remote location may be considered to be the condenser section. The same designations of vaporization, or evaporator, section and condenser section may be applied to each rotor heat pipe. Moreover, in accordance with the embodiment of the invention illustrated in FIGS. 1, 2, and 3, each rotor heat pipe extends axially beyond the rotor 34 from two opposite ends thereof. Consequently, each rotor heat pipe has two condenser sections and a vaporization, or evaporator, section located between the two condenser sections.

Figure 6:
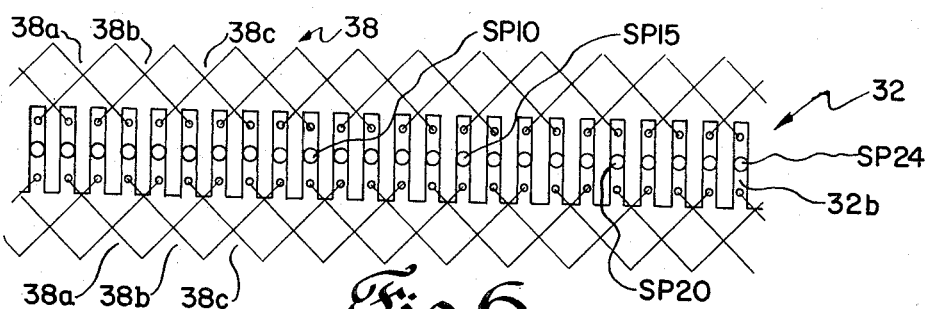
FIG. 6 is a horizontally developed view diagrammatically showing the slot and adjacent teeth of the stator of the induction motor of FIGS. 2 and 3; the heat pipes being located in the centers of the stator slots with separate electrical conductor windings situated in the tops and bottoms of the stator slots with the heat pipes being located between said separate windings.
Figure 7:
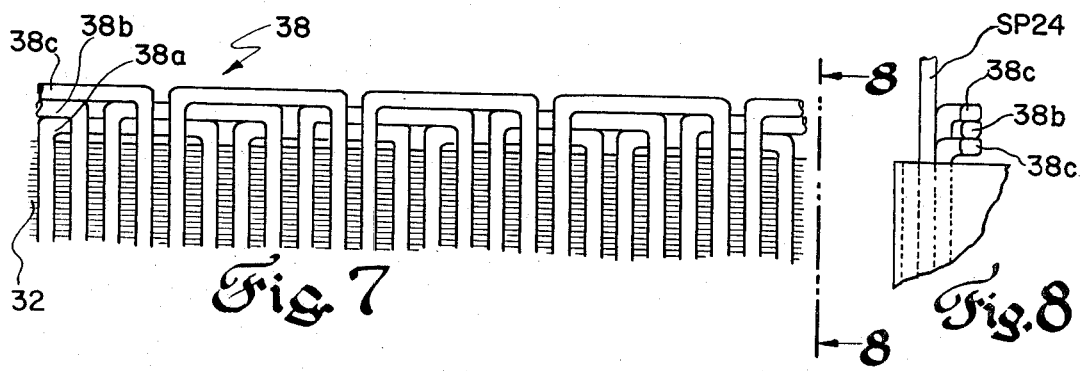
FIG. 7 is another horizontally developed view diagrammatically showing the slots and adjacent teeth of the stator of the induction motor of FIGS. 2 and 3; the end turns of the electrical conductor windings being illustrated as exiting from the bottoms of the stator slots below the heat pipes located in said slots.
Figure 8:
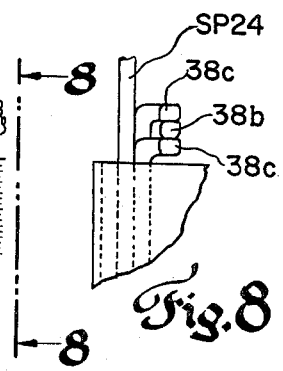
FIG. 8 is an end view taken along the section 8—8 in FIG. 7.
Figure 9:
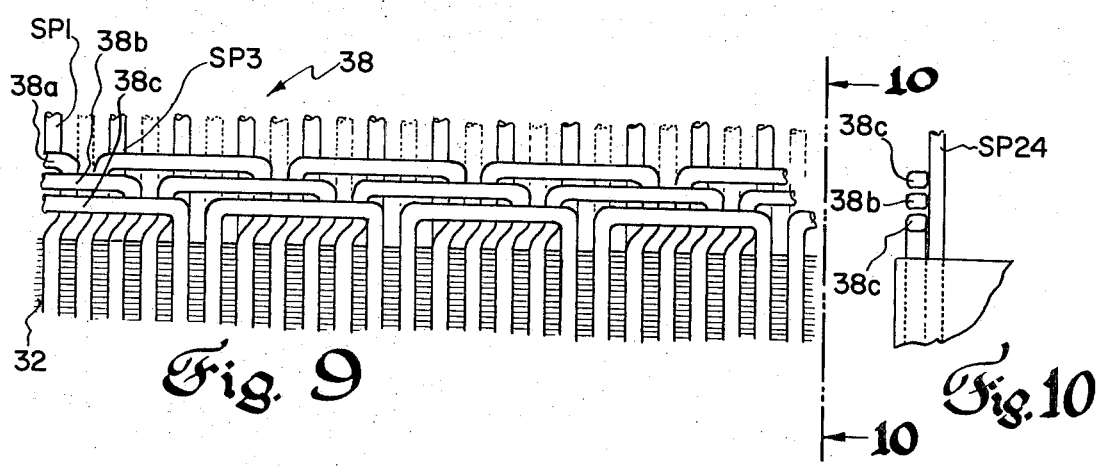
FIG. 9 is another horizontally developed view diagrammatically showing the slots and adjacent teeth of the stator of the induction motor of FIGS. 2 and 3; the end turns of the electrical conductor windings being shown as exiting from the tops of the stator slots above the heat pipes located in each stator slot.
Figure 10:
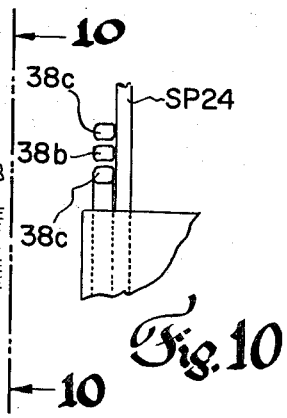
FIG. 10 is an end view taken along the section line 10—10 in FIG. 9.

As shown in FIG. 2 each stator heat pipe SP1...SP24 is situated in its respective slot 32b such that it is in approximately the middle of the slot. Also located in each stator slot 34b, together with a heat pipe, are electrical conductors forming part of the electrical winding of the stator. For purposes of clarity the electrical conductors forming part of the stator electrical windings are not illustrated in FIG. 2 as being within the respective slots 32b. However, in FIGS. 3 and 6 through 10 the electrical conductors forming the electrical winding of the stator are illustrated. The conductors forming the electrical winding of the stator are designated, generally, in FIGS. 3 and 6–10 by the reference number 38. The stator electrical winding 38 is comprised of three conductor groups 38a, 38b, and 38c which form a three-phase electrical winding 38. As shown in FIG. 6, in a fragmentary, horizontally-developed, diagrammatic, end view of the stator 32, each conductor group 38a, 38b, and 38c is divided into two halves. One half of each conductor group is located in the bottom of each slot 32b while another half of a conductor group is located in the top, or air gap side, of the slot 32b. Each stator heat pipe is located in the middle of an individual one of the stator slots 32b and is situated between two conductor group halves occupying said slot. By locating the stator heat pipes SP1...SP24 in individual slots between halves of electrical conductor groups, as indicated in FIG. 6, the heat flow paths from the electrical conductors to the stator heat pipes is significantly reduced. FIGS. 6 through 10 illustrate the electrical winding scheme employed.

In many conventional electric motors, the primary heat flow path out of the stator slots in a direction axially along the stator slots and axially along the copper conductors therein to the end turns of the electrical windings located beyond the stator in an ambient air environment. Thus, the high thermal conductivity of the copper conductors is used to advantage in such heat flow paths. In the present invention, however, the heat flow paths in the stator slots is in a direction crosswise of the electrical conductors therein, perpendicular to the direction of current flow in the individual conductors. Thermal conductivity in such a direction is largely a function of the thermal conductivity of the non-metallic medium surrounding the copper conductors. In accordance with the present invention, thermal conductivity in the aforementioned direction of heat flow is made as high as possible by using a commercially available potting compound comprising an epoxy resin filled with moderate thermal conductivity non-metallic solid particles. This potting compound is employed for "wet winding" the electrical conductors in the slots of the stator. One such potting compound, among others, which may be used for the aforesaid purpose is designated as Stycast 2762; the name Stycast being a trademark for the potting compound which is available from Emerson and Cuming, Incorporated. The aforementioned potting compound impregnates the electrical conductors and thermally connects but electrically isolates the heat pipes from the conductors. Each of the conductors is insulated electrically with HML insulation. HML is a registered trademark of E.I. DuPont de Nemours and Company, Incorporated. It is to be understood that insulation other than that just stated may be employed to electrically insulate the electrical conductors forming the stator windings. In addition, for the purpose of electrically insulating the electrical conductors in the stator slots from the steel laminations forming the stator 32 a dielectric slot liner (not shown) is located in each of the stator slots 32b and is in direct contact with the wall surfaces of the wall stator slots thereby forming a layer, or liner, of electrical insulating material therein. One such slot liner material, among others, which may be used in des- ignated by the trademark KAPTON which is a registered trademark of E.I. DuPont de Nemours Company, Incorporated.

Figure 4:
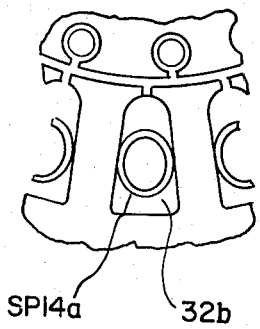
FIG. 4 is a fragmentary view of one of the stator slots having a heat pipe therein and showing an alternative cross-sectional form (elliptical) which the heat pipe may have.
Figure 5:
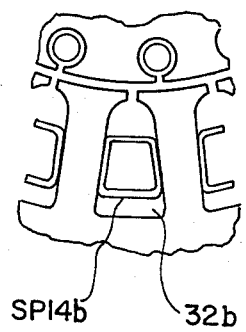
FIG. 5 is another fragmentary view of one of the stator slots having a heat pipe therein and showing another alternative cross-sectional form (rectangular) which the heat pipe may have.

Shown in FIGS. 4 and 5 are other alternative cross-sectional configurations which the stator heat pipes may have. In FIG. 4 the heat pipe situated within the stator slot 32b has an elliptical configuration, as shown. In FIG. 5 the stator heat pipe residing in the slot 32b has a more or less rectangular, or square, cross section as shown. The elliptical heat pipe in FIG. 4 being designated by the reference character SP14a; the heat pipe having the rectangular cross section in FIG. 5 being designated by the reference character SP14b. In general, the cross-sectional configuration of the stator heat pipes may be of any hollow manufacturable shipe and of a material which can be hermetically sealed and to which a cooling fin structure, hereinafter discussed, may be connected. Copper tubing may be employed. Copper has a relatively high thermal conductivity.

As shown in FIGS. 1, 3, 12, and 13 a plurality of annular cooling fins 40 are connected to the condenser section of the stator heat pipes. The stator heat pipes, arranged as shown in FIGS. 1 and 3, extend beyond the stator 32 in only one direction, with neighboring heat pipes extending in opposite directions from the stator 32, as hereinbefore discussed. With the arrangement shown that heat pipes at each end of the stator may be connected with annular fins 40 as shown in FIG. 12 without the danger of providing any short-circuit electrical loops which would provide unwanted current flow paths interlinking with stator magnetic flux.

Similarly, as shown in FIGS. 1 and 3 a plurality of annular copper cooling fins 42 is connected to the rotor heat pipes at each of thp protruding condenser sections thereof at opposite sides of the rotor 34. Each of the rotor heat pipe cooling fins is an annular copper member similar to the annular cooling fin 40, a fragmentary view of which is shown in FIG. 12.

The rotor heat pipes RP1...RP20, which extend axially beyond both ends of the rotor 34, also carry rotor current in accordance with the invention. Hence, the rotor heat pipes are made of a material having good electrical conductivity as well as good thermal conductivity. Copper, among other materials, is a suitable material. Annular end rings 44 and 46, shown in FIG. 3, are located at opposite ends of the rotor 34. End rings 44 and 46 are made of electrically conductive material such as copper, aluminum, etc. Each of the end rings, 44 and 46, has a plurality of openings therethrough, the openings being regularly spaced and arranged in a circular pattern. Each rotor heat pipe, RP1...RP20, is located with respect to the pair of end rings 44 and 46, at opposite ends of the rotor 34, such that each rotor heat pipe passes through a registered pair of openings in the respective end rings 44 and 46, as suggested in FIG. 3. End rings 44 and 46 electrically interconnect the rotor heat pipes and, thus, serve the same purpose as rotor end rings serve in the rotor of a conventional induction motor; i.e., the end rings electrically interconnect rotor conductor bars at opposite ends of the rotor.

FIG. 14 is a diagrammatic illustration showing a representative stator heat pipe SP1, employed in the induction motor 30 shown in FIG. 3. As indicated the heat pipe SP1 is comprised of a relatively long copper tube 48, the inside wall surface of which is lined with a capillary structure, or wick, 50. The heat pipe contains a two-phase fluid coolant. FIG. 15 is a diagrammatic illustration showing a representative rotor heat pipe RP11 used in the rotor of the induction motor 30 shown in FIG. 3. As shown, the heat pipe RP11 in FIG. 15 is comprised of an elongated copper tube 48. However, since the heat pipe RP11 is employed in a moving rotor 34 the capillary structure, or wick, is not needed. The tube 48 forming heat pipe RP11 also contains a two-phase fluid coolant. In FIGS. 14 and 15 the evaporator and condenser sections of the heat pipes SP1 and RP11 are labeled.

The stator cooling mechanism is as follows: heat generated in the stator windings and stator laminations is conducted radially to the stator heat pipes which are located in the stator slots. The heat pipe then transfers heat to an external location remote from the stator. At this external location a finned air exchanger connected to the condenser sections of the stator heat pipes dissipates the heat to the ambient air. Thus, a representative heat flow path according to the invention is: (1) radial conduction into the heat pipe, (2) axial heat transport in the heat pipe, and (3) convection to ambient air through a finned heat exchanger comprising the condenser section of each stator heat pipe having cooling fins connected thereto.

Similarly, in the rotor heat is generated in the side walls of each of the rotor heat pipes (the rotor heat pipes also serve as electrical conductors). Thus, according to the invention a representative heat flow path in the rotor is as follows: (1) heat flows radially through in the rotor heat pipe (electrical conductor), (2) then, axially along the rotor heat pipe, and (3) finally, radially through the rotor heat pipe in the condenser section(s) thereof to the air stream through the finned heat exchanger comprising the condenser sections of the rotor heat pipe having the cooling fin structure connected thereto. Air motion is generated by rotation of the finned rotor heat pipes as the rotor rotates.

Since a relatively high centrifugal force is set up in the rotor heat pipes as a result of rotor rotation wick structures are not required in the rotor heat pipes, as indicated in FIG. 15. In rotational operation, the two-phase fluid coolant fills an outer half of the rotor heat pipes due to high centrifugal force. (See FIGS. 16 and 17). As heat is generated in the wall of the heat pipe liquid is evaporated, tending to reduce the liquid level in the evaporator section. Vapor flows to the condenser section, or sections, where it is condensed on the bare remaining half of the inner wall surface of the heat pipe. Thus, droplets of condensate are forced to the outer section of the heat pipe, thus increasing the liquid level therein. With a high g field a difference in liquid height cannot exist along the tube 48 and the liquid will be returned to the evaporator section to complete the cycle.

In FIGS. 16 and 17 two rotor heat pipps RP1 and RP11 are shown in cross section. These cross section views correspond to the orientation shown in FIG. 2. The rotor heat pipe RP1 at a particular instant of rotor rotation being in the position shown in FIG. 2 while the rotor heat pipe RP11 is in a diammetrically opposite position at the same instant. The levels of the liquid phases of the coolant are indicated in FIGS. 16 and 17 by the designation L.

The induction motor 30 shown in FIG. 3 is also comprised of: a yoke 52; a pair of apertured cylindrical members 54 arranged axially at opposite ends of the yoke 52 and having a plurality of air flow passages 56...56 therethrough; a pair of end plates 58, including bearing structures 60 for the double-ended shaft 36 of the rotor 34. Also included for purposes of stiffening the rotor heat pipes array are a pair of end plates 62 which include the air passages 64 as indicated. The end plates 62 are attached to the extremities of the rotor heat pipes as shown in FIG. 3 so that the array of rotor heat pipes become a more rigid structure able to withstand the dynamic forces of rotor rotation.

FIG. 18 shows another embodiment of an induction motor 30A in accordance with the invention. The motor 30A has the same kind of rotor 34 and rotor heat pipe array RP1...RP20 as shown in FIG. 1 for induction motor 30. That is, the rotor heat pipes extend from two opposing ends of the rotor 34. However, the motor 30A employs a modified stator 32X having the same number of slots as the stator 32 (FIG. 1). However, the stator 32X has 24 heat pipes located in the 24 slots thereof; said stator heat pipes being designated generally by the reference numbers SP1X...SP24X. In FIG. 18 two such heat pipes SP1X and SP14X are shown. These stator heat pipes are as indicated relatively long and extend from both opposite ends of the stator 32X. Thus, the stator heat pipes SP1X...SP24X have intermediate vaporization sections situated between two condensation sections, similar to the heat pipe shown in FIG. 15, except that the stator heat pipes employed in the motor 30A of FIG. 18 include wicks, such as the wicks 50. As shown in FIG. 18 the condenser sections of the stator heat pipes and those of the rotor heat pipes are located parallel to each other at opposite ends of the stator and rotor stacks. The cooling fins 42 on the condenser sections of the rotor heat pipes function during rotor rotation to act as a fan and thus move ambient air over the condenser sections of both the rotor and the stator heat pipes. The double ended condenser sections on the stator heat pipes SP1X...SP24X include a plurality of annular cooling fins 66, the detail of each cooling fin 66 being illustrated at FIG. 11. In FIG. 11 there is shown a fragmentary view of a generally annular cooling fin 66. However, each cooling fin 66 is comprised of a plurality of segments 66a of copper sheet or the like which are dielectrically separated from each other by a smaller segment 66b situated between adjacent segments 66a. Since the stator heat pipes extend beyond the stator stack at both ends of the stator dielectric protection must be provided to prevent circulating currents from flowing between the stator heat pipes. This is required because the stator heat pipes are in a region of the relatively high magnetic flux and short circuits must not be established between adjacent heat pipes.

Another embodiment of the invention is shown in FIG. 19 whereat another induction motor 30B is illustrated. The motor 30B includes a rotor 34Y situated for rotation within a stator 32Y. Stator 32Y has the same number of stator slots as in the stator of the induction motor 30 and the rotor 34Y has the same number of rotor slots as in the rotor of the induction motor 30. In the embodiment shown at FIG. 19 the stator 32Y has included in the slots thereof a plurality of stator heat pipes designated SP1Y...SP24Y and the rotor 34Y has a plurality of heat pipes located in the slots thereof. The rotor heat pipes are designated by the reference characters RP1Y...RP20Y. As shown, the condenser sections of both the stator and rotor heat pipes protrude from but one end, the same end, of the stacks of laminations forming the rotor 32Y and the stator 34Y. The condenser sections of each rotor heat pipe are provided with a plurality of cooling fins 42 while the condenser sections of each stator heat pipe is provided with a plurality of cooling fins 40. Again, rotation of the rotor and the rotor heat pipes having the cooling fins attached thereto creates fan action for cooling the rotor and stator heat pipes.

The induction motor diagrammatically shown in FIG. 19 is shown in more detail in FIG. 20. As shown, the condenser sections of the rotor and stator heat pipes are cantilevered from one end of the stacks of laminations forming the motor 34Y and the stator 32Y. In the detailed embodiment shown in FIG. 20 the end rings 44Y and 46Y are made of electrically conductive material and serve the same purpose as the end rings 44 and 46 in the induction motor 30, hereinbefore discussed with reference to FIG. 3. Also, as shown a housing 66 is provided for partially enclosing the condenser sections of the stator and rotor heat pipes. The housing 68 has a plurality of openings 68 therein which serve as air passages. In addition, the housing 66 includes a large central aperture designated generally by the reference number 70 which also serves as an air passage.

In the three embodiments, induction motors 30, 30A, and 30B the rotation of the rotor heat pipes which include cooling fins provides a fan action for forcing air over the finned condenser sections of the rotor and stator heat pipes thereby cooling them.

The wick material 50, shown in FIG. 14, may be a metallic or non-metallic material. Water, among other coolants, is one two-phase fluid which may be used in the rotor and stator heat pipes.

The induction motor 30 shown in FIG. 3 is a three-phase, four pole, wye-connected induction motor, operable from a 250 volt, 400 Hz source and rated at 10 horsepower.

The rotor heat pipes and rotor slots serving, also, as electrical conductors may be skewed, as may the stator slots and the windings arranged therein. Such a skewed configuration for conventional induction motors being common.

While specific embodiments of the invention have been illustrated and described in some detail to illustrate the invention, it is to be understood that the invention may be otherwise embodied without departing from the spirit and scope of the invention which is hereinafter defined in the claims.

What is claimed is:

1. In combination, a rotor, a plurality of rotor heat pipes, each rotor heat pipe including an evaporator section and a condenser section, said plurality of rotor heat pipes being distributively arranged on said rotor so that their evaporator sections may receive heat from the region of said rotor and transport the heat to their respective condenser sections which are remotely located from said rotor, said rotor heat pipes being electrically conductive, and end ring means for electrically interconnecting said rotor heat pipes.

2. In combination, a stator including a plurality of slots distributively included therein, a plurality of stator heat pipes, each stator heat pipe including an evaporator section and a condenser section, each slot containing an evaporator section of one of said heat pipes with a condenser section of the same heat pipe being outside the slot and remotely located from said stator, and an electrical stator winding comprising a plurality of electrical conductors, each said stator slot including some of said conductors as well as an evaporator section of a stator heat pipe.

3. In combination, a stator including a plurality of slots distributively included therein, a plurality of stator heat pipes, each stator heat pipe including an evaporator section and a condenser section, each slot containing an evaporator section of one of said heat pipes with a condenser section of the same heat pipe being outside the slot and remotely located from some stator, an electrical stator winding comprising a plurality of electrical conductors, each said stator slot including some of said conductors as well as an evaporator section of a stator heat pipe, and potting compound in each said stator slot contacting said evaporator section and said conductors, said potting compound comprising an epoxy resin including therein non-metallic particles whereby said compound has relatively low electrical conductivity and at least relatively moderate thermal conductivity.

4. In combination, a rotor including a plurality of slots distributively included therein, a plurality of rotor heat pipes, each rotor heat pipe including an evaporator section and a condenser section, each slot containing an evaporator section of one of said heat pipes with a condenser section of the same heat pipe being outside the slot and remotely located from said rotor, said rotor heat pipes being electrically conductive, and end ring means electrically interconnecting said rotor heat pipes.

5. In combination, a stator including a plurality of slots distributively included therein, a plurality of stator heat pipes, each stator heat pipe including an evaporator section and a condenser section, each slot containing an evaporator section of one of said heat pipes with a condenser section of the same heat pipe being outside the slot and remotely located from said stator, and cooling fin means on said condenser sections, said cooling fin means being comprised of a plurality of annular members comprising a plurality of segments of relatively high thermal conductivity material, each said thermal conductivity segment being separated by a dielectric segment, each said condenser section being connected to at least one of said segments of high thermal conductivity.

6. In combination, a rotor, a plurality of rotor heat pipes, each rotor heat pipe including an evaporator section and a condenser section, said plurality of rotor heat pipes being distributively arranged on said rotor so that their evaporator sections may receive heat from a region of said rotor and transport the heat to their respective condenser sections which are remotely located from said rotor, said rotor heat pipes being electrically conductive, end ring means for electrically interconnecting said rotor heat pipes, a stator including a plurality of slots distributively included therein, a plurality of stator heat pipes, each stator heat pipe including an evaporator section and a condenser section, each slot containing an evaporator section of one of said stator heat pipes with a condenser section of the same stator heat pipe being outside the stator slot and remotely located from said stator, and an electrical stator winding comprising a plurality of electrical conductors, each said stator slot including some of said conductors as well as an evaporator section of a stator heat pipe.

7. The combination, according to claim 6, further comprising a potting compound in each said stator slot contacting said evaporator section and said conductors, said potting compound comprising an epoxy resin including therein non-metallic particles whereby said compound has relatively low electrical conductivity and at least relatively moderate thermal conductivity.

* * * * *